(12) United States Patent
Alam et al.

(10) Patent No.: US 12,548,101 B2
(45) Date of Patent: Feb. 10, 2026

(54) TRANSPORTATION OPERATOR COLLABORATION FOR ENHANCED USER EXPERIENCE AND OPERATIONAL EFFICIENCY

(71) Applicant: Intel Corporation, Santa Clara, CA (US)

(72) Inventors: S M Iftekharul Alam, Hillsboro, OR (US); Satish Chandra Jha, Portland, OR (US); Ned M. Smith, Beaverton, OR (US); Vesh Raj Sharma Banjade, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 17/132,816

(22) Filed: Dec. 23, 2020

(65) Prior Publication Data

US 2021/0125300 A1    Apr. 29, 2021

(51) Int. Cl.
*G06Q 50/40* (2024.01)
*G01C 21/34* (2006.01)
(Continued)

(52) U.S. Cl.
CPC ......... *G06Q 50/40* (2024.01); *G01C 21/3492* (2013.01); *G06N 20/00* (2019.01);
(Continued)

(58) Field of Classification Search
CPC ............... G06Q 50/40; G06Q 30/0202; G01C 21/3423; G01C 21/3492; H04L 67/02;
(Continued)

(56) References Cited

U.S. PATENT DOCUMENTS

2017/0147951 A1\*  5/2017  Meyer .................... G06Q 50/14
2018/0224866 A1\*  8/2018  Alonso-Mora ...... G05D 1/0291
(Continued)

FOREIGN PATENT DOCUMENTS

CN        109190795 A  \*  1/2019  ............. G06Q 10/04
CN        110472810 A  \*  11/2019  ......... G06Q 30/0205
(Continued)

OTHER PUBLICATIONS

Eckhardt et al., "Mobility As a Service for linking Europe", Chalmers University of Technology, ResearchGate, May 2017. (Year: 2017).\*

(Continued)

*Primary Examiner* — Pan G Choy
(74) *Attorney, Agent, or Firm* — Schwegman Lundberg & Woessner, P.A.

(57) ABSTRACT

Methods, systems, and computer programs are presented for sharing information among Mobility as a Service (MaaS) providers to improve service delivery while protecting data privacy. A first MaaS system receives, from a second MaaS system, a request to predict demand generated by the first MaaS system for user trips that transfer from the first MaaS system to the second MaaS system. The first MaaS system predicts, in response to the request, the demand generated by the first MaaS system using a predictor model executing at the first MaaS system on a trusted execution environment (TEE) to access data of the first MaaS system. The first MaaS system sends the predicted demand to the second MaaS system.

23 Claims, 12 Drawing Sheets

(51) Int. Cl.
  *G06N 20/00* (2019.01)
  *G06Q 30/0202* (2023.01)
  *H04L 67/306* (2022.01)
  *H04W 4/029* (2018.01)
(52) U.S. Cl.
  CPC ....... *G06Q 30/0202* (2013.01); *H04L 67/306* (2013.01); *H04W 4/029* (2018.02)
(58) Field of Classification Search
  CPC ....... H04L 67/12; H04L 67/306; H04L 67/52; H04W 4/029; G06N 20/00
  See application file for complete search history.

(56) References Cited

U.S. PATENT DOCUMENTS

| | | | |
|---|---|---|---|
| 2018/0350024 A1* | 12/2018 | Kaufman | G06Q 50/14 |
| 2019/0042937 A1 | 2/2019 | Sheller et al. | |
| 2019/0285425 A1* | 9/2019 | Ludwick | G06Q 10/0631 |
| 2020/0159961 A1* | 5/2020 | Smith | G06N 3/08 |
| 2020/0178198 A1* | 6/2020 | Ding | H04W 60/04 |
| 2020/0327250 A1* | 10/2020 | Wang | G06N 20/00 |
| 2020/0410429 A1* | 12/2020 | Wiesenberg | G06Q 10/063114 |
| 2021/0018587 A1* | 1/2021 | Harris | G01C 21/3848 |
| 2021/0108939 A1* | 4/2021 | Ahmed | G06N 3/084 |
| 2022/0332350 A1* | 10/2022 | Jha | H04W 4/46 |

FOREIGN PATENT DOCUMENTS

| | | | | |
|---|---|---|---|---|
| CN | 113383351 A | * | 9/2021 | ............. G06Q 10/04 |
| JP | 2022514134 A | * | 2/2022 | ............. G06N 3/044 |
| WO | WO-2019030221 A1 | * | 2/2019 | ....... G06Q 10/06312 |
| WO | WO-2019203806 A1 | * | 10/2019 | |
| WO | 2019236755 | | 12/2019 | |
| WO | WO-2019236755 A1 | * | 12/2019 | ............. H04W 4/40 |
| WO | WO-2020140038 A1 | * | 7/2020 | ............. G06N 20/00 |

OTHER PUBLICATIONS

Gu et al., "Reaching Data Confidentiality and Model Accountability on the CalTrain", 2019 49th Annual IEEE/IFIP International Conference on Dependable Systems and Networks (DSN). IEEE Computer Society. (Year: 2019).*

Zhang et al., "Enabling Execution Assurance of Federated Learning at Untrusted Participants", Institute for Network Sciences and Cyberspace & Department of Computer Science and Technology, Tsinghua University, Beijing National Research Center for Information Science and Technology. IEEE Xplore, 2020. (Year: 2020).*

"World Business Council for Sustainable Development, Enabling data-sharing: Emerging principles for transforming urban mobility", https: www.wbcsd.org Programs Cities-and-Mobility Transforming-Urban-Mobility Digitalization-and-Data-in-Urban-Mobility Resources Enabling-data-sharing-Emerging-principles-for-transforming-urban-mobility, (2020), pgs.

"FedAI Ecosystem", https: www.fedai.org cases , (Sep. 23, 2019), 2 pgs.

Callegati, F, "Smart mobility for all: A global federated market for mobility-as-a-service operators", 2017 IEEE 20th International Conference on Intelligent Transportation Systems (ITSC), (2017), 8 pgs.

Eckhardt, Jenni, "Mobility As A Service For Linking Europe, Technology for MaaS", (May 2017), 49 pgs.

Gross-Puppendahl, Tobias, "Leveraging AI Technologies for Porsche's Future", https: medium.com next-level-german-engineering leveraging-ai-technologies-for-porsches-future-a803e2c78896, (Sep. 21, 2018), 10 pgs.

Lu, S, "Collaborative Learning on the Edges: A Case Study on Connected Vehicles", HotEdge 2019, (2019), 8 pgs.

"European Application Serial No. 21198306.9, Response filed Dec. 23, 2022 to Extended European Search Report mailed Mar. 16, 2022", 10 pgs.

"European Application Serial No. 21198306.9, Extended European Search Report mailed Mar. 16, 2022", 8 pgs.

Mahony, Aidan O, "A Systematic Review of Blockchain Hardware Acceleration Architectures", 30th Irish Signals and Systems Conference (ISSC), IEEE, (Jun. 17, 2019), 1-6.

"European Application Serial No. 21198306.9, Communication Pursuant to Article 94(3) EPC mailed Jun. 10, 2024", 6 pgs.

"European Application Serial No. 21198306.9, Response filed Oct. 8, 2024 to Communication Pursuant to Article 94(3) EPC mailed Jun. 10, 2024", 32 pgs.

* cited by examiner

TRANSPORTATION OPERATOR COLLABORATION FOR ENHANCED USER EXPERIENCE AND OPERATIONAL EFFICIENCY

TECHNICAL FIELD

The subject matter disclosed herein generally relates to methods, systems, and machine-readable storage media for improving transportation services in a multi-provider environment.

BACKGROUND

Mobility as a Service (MaaS) operators may have contracts with different transportation service providers (TSPs), including public and private entities, to provide transport services within a certain region. The servicing area may be large, even across country borders, which makes it difficult for a single MaaS operator to satisfy all the mobility requirements of all subscribers. Further, the transportation modes offered by each MaaS operator may also differ. Hence, cooperation among MaaS operators for expanding the coverage of their services and improving business opportunities becomes a challenging proposition to optimize services for users and revenue opportunities.

Initial implementations of MaaS have shown that sharing data to create a more integrated user experience can result in benefits for all parties. For example, Uber® users can book tickets on regional train services, which results in increases in train ridership and Uber rides starting or ending at train stations.

However, today, most TSPs lack the ability to collaborate with other TSPs. Further, when TSPs want to collaborate, it is difficult to exchange information as their Information Technology (IT) systems may utilize different programs, interfaces, databases, etc. This hinders the ability to determine optimal routing services and maximize user satisfaction.

Further yet, privacy concerns and regulations make data sharing complicated, sometimes impossible. What is needed is a privacy-preserving data-sharing framework among the MaaS operators and TSPs to enable all the participants to create and capture value from data.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
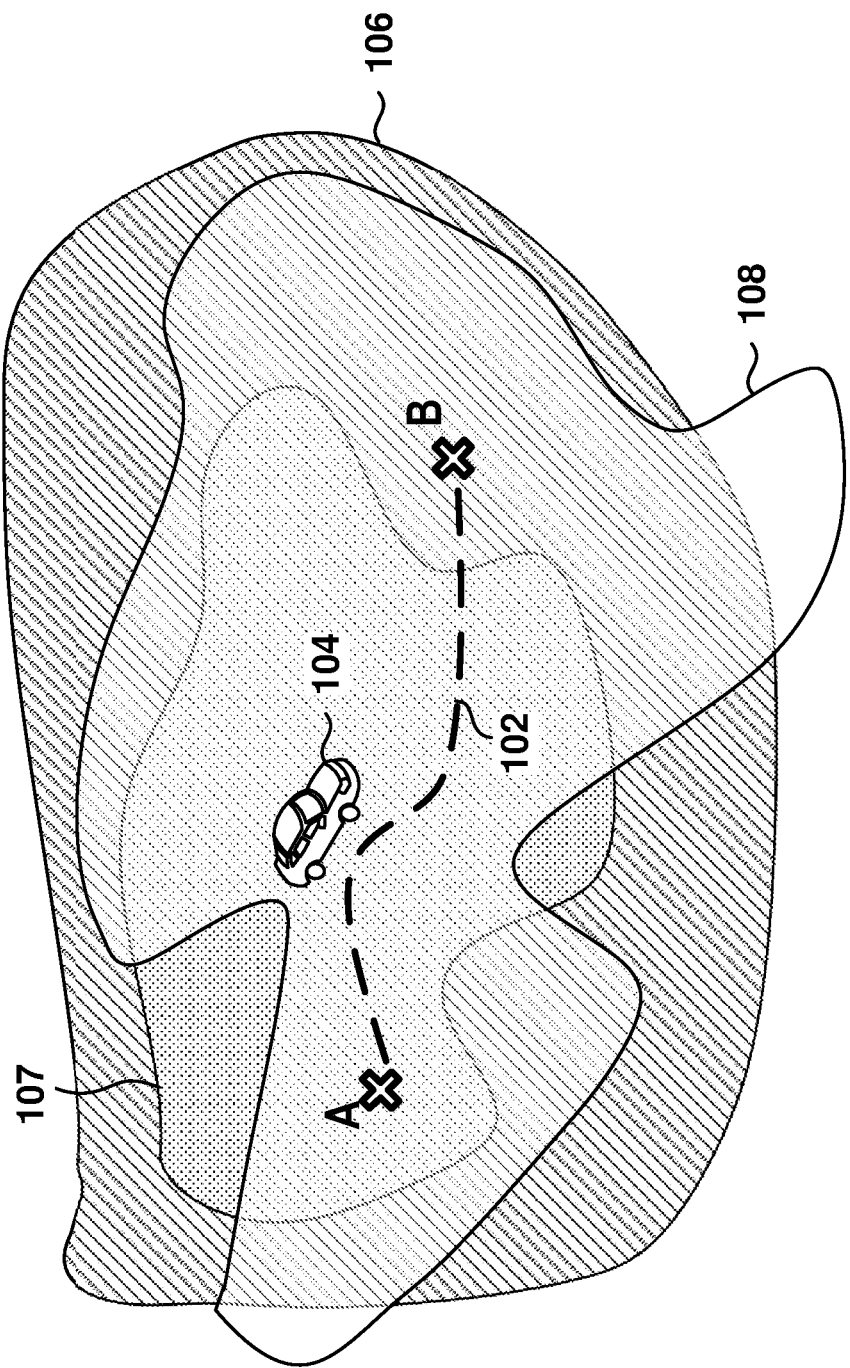
FIG. 1 illustrates a Mobility as a Service (MaaS) scenario with multiple Transportation Service Providers (TSPs).

Example methods, systems, and computer programs are directed to sharing information among MaaS providers to improve service delivery while protecting data privacy. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Traditional network operators provide mobile data services and have roaming agreements that enable subscribers of a first network operator to connect to, and utilize, resources of a second network operator. Normally, these roaming agreements do not include collecting contextual and ambient data sets related to the various activities the users perform outside the realm of the network operator (e.g., telemetry gathering).

The problem with existing approaches is that the fragmented context database environment results in partial, and possibly misleading, insights regarding the end-to-end user experience. In many cases, users are not even aware of which data is collected about them or given the choice on how to control the data that the various entities collect.

In one aspect, implementations give users and operators greater control over all the context and ambient data by creating a clearing house for assembling this data. A directory of the data reveals the categories of data potentially available, spanning the various collection points, which may include MaaS operators, TSPs, network operators, and endpoint platforms. Fragment database owners (e.g., TSP) are motivated to contribute their fragment of data in order to gain access to the other curated fragment data sets.

In one aspect, federated learning techniques are used to enable logical access to the fragmented context databases, but without requiring merging of the context databases (which may violate privacy principles and regulations). Further, implementations leverage a Trusted Execution Environment (TEE) to enable one entity to access users' context from another entity's database, while preserving the privacy of sensitive context data.

The benefits of the solution include: privacy-preserving data sharing framework among multiple MaaS operators, a method to form dynamic partnership across operators to serve users, and an expansion of transportation services across geographical regions through MaaS operator partnerships.

One general aspect includes a first MaaS system comprising means for receiving, from a second MaaS system, a request to predict demand generated by the first MaaS system for user trips that transfer from the first MaaS system to the second MaaS system. Further, the first MaaS system comprises means for predicting, in response to the request, the demand generated by the first MaaS system using a predictor model executing at the first MaaS system on a trusted execution environment (TEE) to access data of the first MaaS system. Further yet, the first MaaS system comprises means for sending the predicted demand to the second MaaS system.

FIG. 1 illustrates a Mobility as a Service (MaaS) scenario with multiple Transportation Service Providers (TSP). Mobility as a Service (MaaS) is the integration of various forms of transport services into a single mobility service accessible on demand. To meet a customer's request, a MaaS operator facilitates a diverse menu of transport options, which may be any combination of public transport, ride-sharing, car-sharing, bike-sharing, taxi, car rental, etc. Each operator may offer services in different areas, such as areas for MaaS operators 106-108. For example, a vehicle 104 going from point A to point B may use a route that includes services from area 107 and area 108 along a route 102.

For the user, MaaS offers added value through use of a single application to provide access to mobility, with a single payment channel instead of multiple ticketing and payment operations. MaaS helps users with their mobility needs and solves the inconvenient parts of individual journeys as well as the entire system of mobility services.

A successful MaaS service brings new business models and ways to organize and operate the various transport options, with advantages for transport operators including access to improved user and demand information and new opportunities to serve unmet demand. The aim of MaaS is to provide an alternative to the use of the private cars that is convenient, sustainable, reduces congestion, and is sometimes cheaper.

Providing users with a seamless mobility experience with reduced operational cost involves collection, aggregation, and sharing of data from various entities. For example, historical data about user preferences and trips can be collected from the MaaS User Application during trip initiation, selection, journey, and trip completion. Similarly, TSPs have data about user demands, congestion on the road, environment, charging conditions, etc., through the sensors of their vehicles. MaaS operators also may have agreements with network service providers, which have useful data regarding people mobility patterns for various geographic areas and times of day. Sharing such data fragments among the MaaS operators will be mutually beneficial, e.g., providing users with better experiences (e.g., zero wait time, no coverage hole), and maintaining a healthy fleet.

One example where data sharing may benefit multiple entities is the case where the TSPs collect information about user preferences, and then this information is used, e.g., by a machine-learning (ML) model, to predict what the user will prefer for the service in future trips. The ML models require a large amount of data for accurate predictions. However, one TSP may not be able to collect enough information for a good model predictor. If multiple TSPs are able to share their data about user preferences, then the accuracy of the models will improve because there is more data available about user preferences.

Another example of the benefits of sharing information is that one TSP may be transporting several users to a certain area that is serviced by another TSP. By having visibility on the traffic in the first TSP, the second TSP is able to better predict user demand and configure the vehicles for satisfying the demand that might arise in a certain area.

Figure 2:
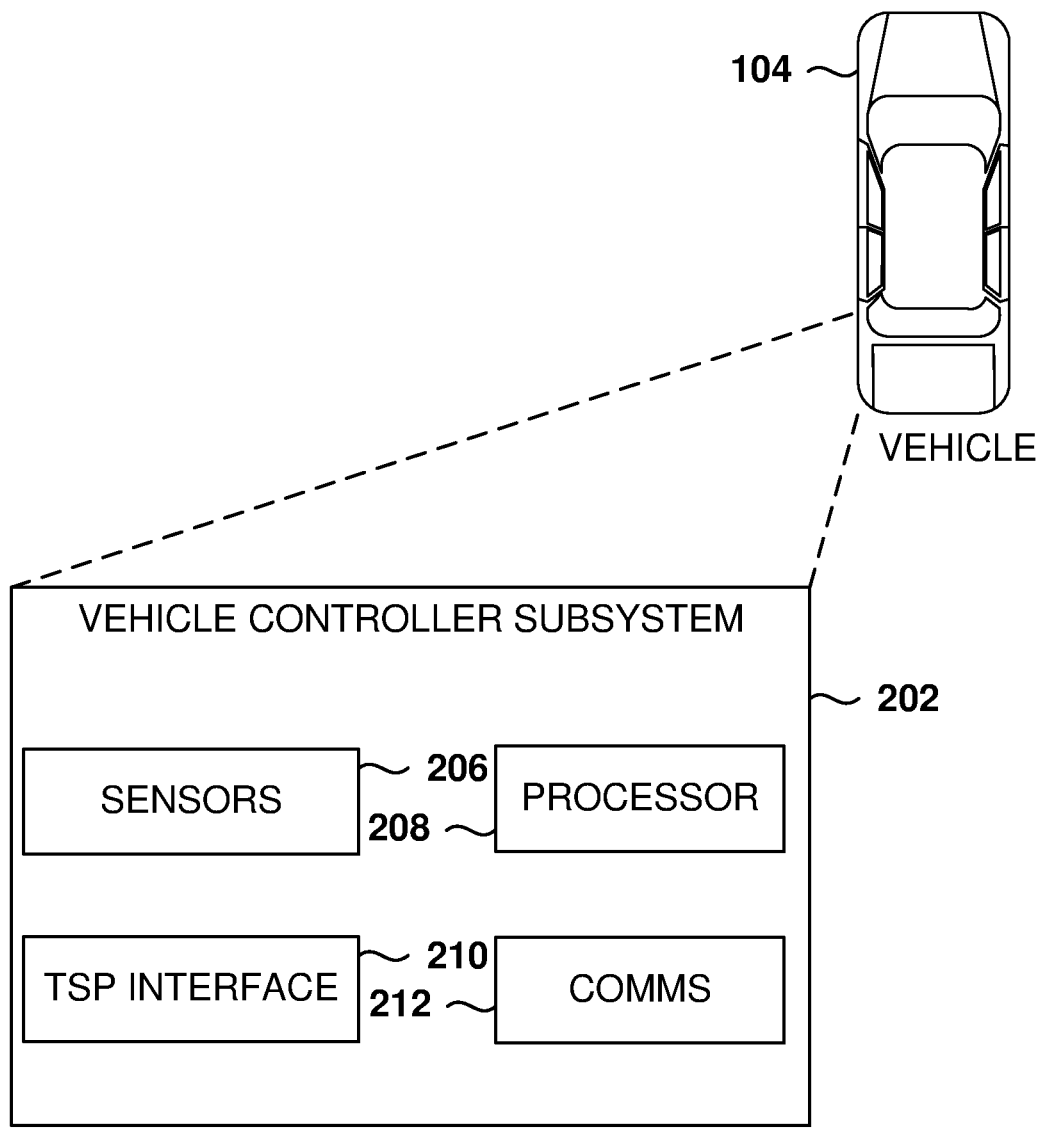
FIG. 2 is a schematic drawing illustrating a system to control a vehicle, according to some example embodiments.

FIG. 2 is a schematic drawing illustrating a system to control a vehicle 104, according to an embodiment. FIG. 2 includes a vehicle controller subsystem 202 incorporated into the vehicle 104.

The vehicle 104 may be any type of vehicle, such as a commercial vehicle, a consumer vehicle, a recreation vehicle, a car, a truck, a motorcycle, or a boat, able to operate at least partially in an autonomous mode. The vehicle 104 may operate at times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes sensors 206, which may include various forward, side, and rearward facing cameras, radar, Light Detection and Ranging (LIDAR), ultrasonic, or similar sensors. The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

In some example embodiments, a vehicle controller subsystem 202 includes sensors 206, a processor 208, a TSP interface 210, and a communications module 212. The communications module 212 may utilize a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

Based on the sensor data, a processor 208 in the vehicle controller subsystem 202 is able to determine whether a possible collision may occur. Based on this determination, the vehicle controller subsystem 202 may initiate corrective action and communicate with nearby vehicles.

The TSP interface 210 interacts with the operation center of the TSP to send and receive information via the communications module 212. For example, the TSP interface 210 may receive commands from the operations center to establish a route for a user, or the TSP interface 210 may send information collected about the trip, such as timing, location, fuel consumption, battery status, distance, passenger occupancy, etc.

Figure 3:
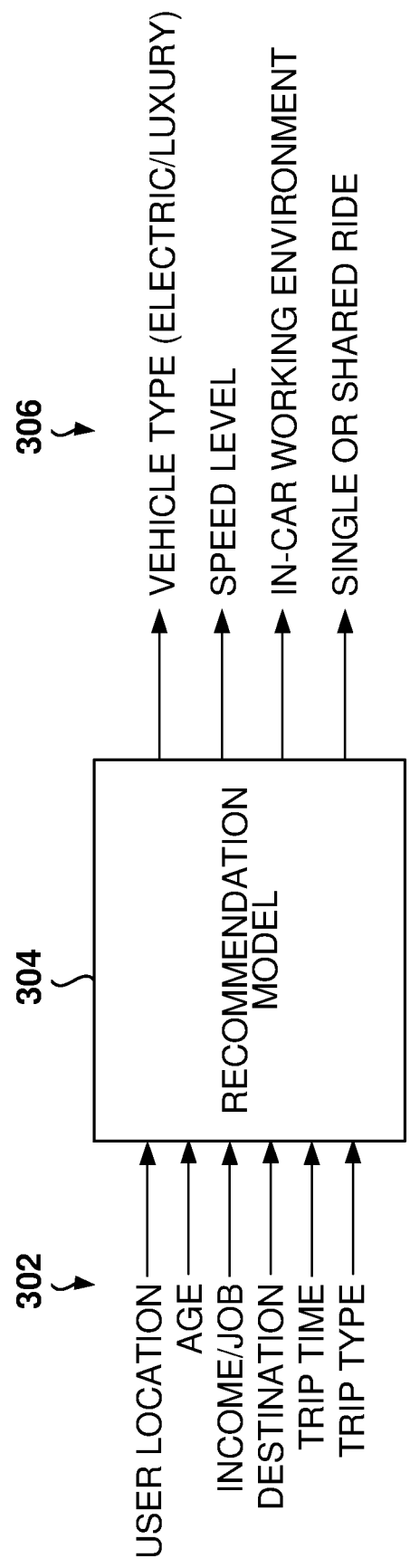
FIG. 3 illustrates the operation of a recommendation model based on user preferences, according to some example embodiments.

FIG. 3 illustrates the operation of a recommendation model 304 based on user preferences, according to some example embodiments. In some example embodiments, an MaaS operator collects user's preference and trip experience data to build a recommendation model 304 to suggest service features that may be of interest to the users. The sharing of such information among the operators would improve the accuracy of their respective prediction models.

In some example embodiments, the recommendation model 304 utilizes features associated with inputs 302 and outputs 306. The inputs 302 may include data about the user, the vehicle, the trip, etc. For example, the inputs 302 may include any combination of user location, age, income, employment, destination, trip time, trip type, etc.

The recommendation model 304 may provide recommendations as outputs 306, which may include vehicle type (e.g., electric or fuel-based, standard or luxury), speed level, in-car working environment (e.g., friendly for remote working or pleasure trip), single or shared ride, etc.

For TSPs, integrating their vehicle and trip data with others TSPs can help to better match the distribution of their fleets with current and anticipated demand, leading to higher utilization, fewer empty miles, reduced dwell times and greater customer satisfaction. Academic research suggests that coordinating drop-off and pick-up locations across TPSs could reduce required fleet size by up to 12 percent.

Figure 4:
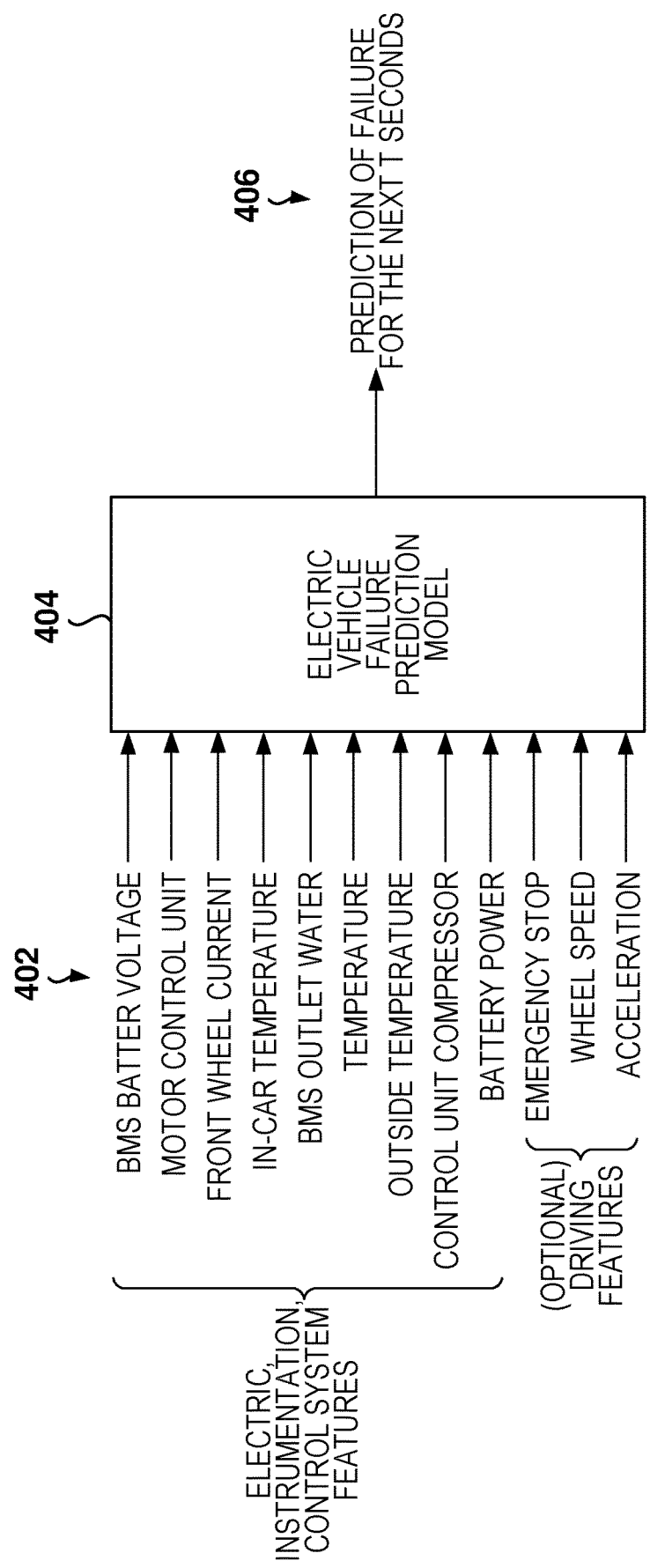
FIG. 4 illustrates the operation of an electric-vehicle failure-prediction model based on electric, instrumentation, and computer-control-system features, according to some example embodiments.

FIG. 4 illustrates the operation of an electric-vehicle (EV) failure-prediction model 404 based on electric, instrumentation, and computer-control-system features, according to some example embodiments.

The fleets of robo-taxis of various MaaS operators may come from the same vendor, which means that the operational health and probability of failure of the vehicles can be predicted based on the data collected from sensors in all the fleets. In order to predict the probability of such failure, the prediction model 404 needs to collect prior failure events, which typically happen with low frequency. Hence, data sharing among the operators will help to overcome the problem of the sparse data set.

In some example embodiments, the EV failure-prediction model 404 utilizes a plurality of features associated with the inputs 402 and the output 406. The inputs 402 may include a combination of electric, instrumentation, and control-system features and driving features (in case of manual driving). The electric, instrumentation, and control-system features may include any combination of Battery Management System (BMS) battery voltage, motor control unit front wheel current, in-car temperature, BMS outlet water temperature, outside temperature, control unit compressor battery power, etc. The driving features may include pressure on brake pedal during emergency stop, wheel speed, acceleration, etc.

The output 406 is a prediction of the probability of failure within a predetermined time period, such as in the next minute, the next hour, the next day, the next week, etc.

Figure 5:
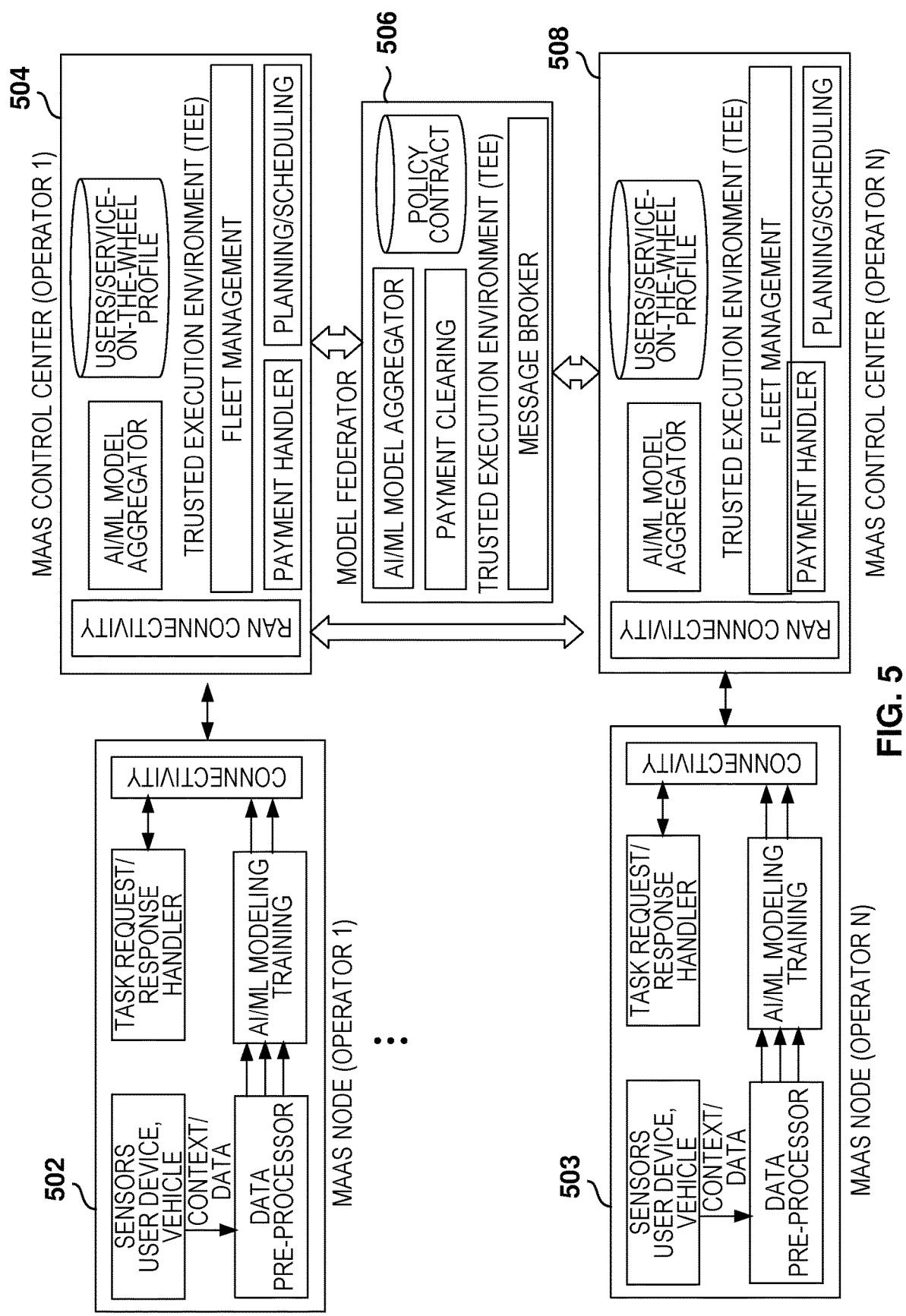
FIG. 5 is a sample architecture for implementing a federated learning-based model with data sharing among multiple operators, according to some example embodiments.

FIG. 5 is a sample architecture for implementing a federated learning-based model with data sharing among multiple operators, according to some example embodiments. Privacy-preserving methods of data sharing among the operators are presented, as well as a dynamic partnering scheme to enable roaming of users.

There are interfaces among the control centers of multiple operators in peer-to-peer fashion and via third party for sharing model parameters, users' requests regarding particular service-on-the-wheel and clearing payments.

The data related to user's preference and operational state of the vehicle's control system is abstracted using one or more machine learning models. The MaaS operators 502-503 agree on the model specification (e.g., regression model, neural network, number of layers, hyper parameters, etc.), and each MaaS operator 502-503 trains its respective model using the data collected on their respective platform (e.g., robo-taxi app, data from sensors). In some example embodiments, a data pre-processor embeds the data to generate a training set for the ML model training.

Based on the agreed frequency of sharing model update, each MaaS operator 502-503 shares the model with a MaaS control center 504, 508, with another MaaS Operator, with a model federator 506. Additionally, the MaaS control centers 504, 508, may share data among themselves or with the model federator 506.

Each MaaS control center 504, 508, performs aggregation of the multiple models available in a Trusted Execution Environment (TEE) using a Federated Learning algorithm (e.g., FedAvg) to generate a MaaS control center model, which is then shared with MaaS nodes and MaaS control centers as agreed upon by the entities.

Additionally, the model federator 506 performs aggregation of the models from the MaaS control centers 504, 508 in a TEE using a Federated Learning algorithm to generate a federated model, which is then shared with MaaS nodes and MaaS control centers as agreed upon by the entities.

The updated models received by the MaaS operators 502-503 are then used by the nodes, and data keeps being collected. With the additional data, the models may be retrained and share, to repeat the cycle and get updates that will improve accuracy over time as additional data is added and considered.

A TEE is a secure, isolated area inside a processor or inside a server, to execute an operation while guaranteeing that the code and data loaded in the TEE are protected with respect to confidentiality and integrity. Privacy sensitive context information (preferences, operational state, location tracking, activity tracking, health monitoring, proximity-based interaction, social distancing, etc.) is protected using the TEE, where access to the context data is exclusively controlled through the TEE.

Federated learning (also known as collaborative learning) is a machine-learning technique that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed.

The MaaS Control Centers 504, 508 may also include a fleet management module for managing vehicles providing transportation services, a payment handler, and a scheduler for scheduling delivery of services. The model federator 506 may also include a payment clearing center to clear payments coming from a plurality of operators and control centers, and a message broker for exchanging information with MaaS control centers.

Figure 6:
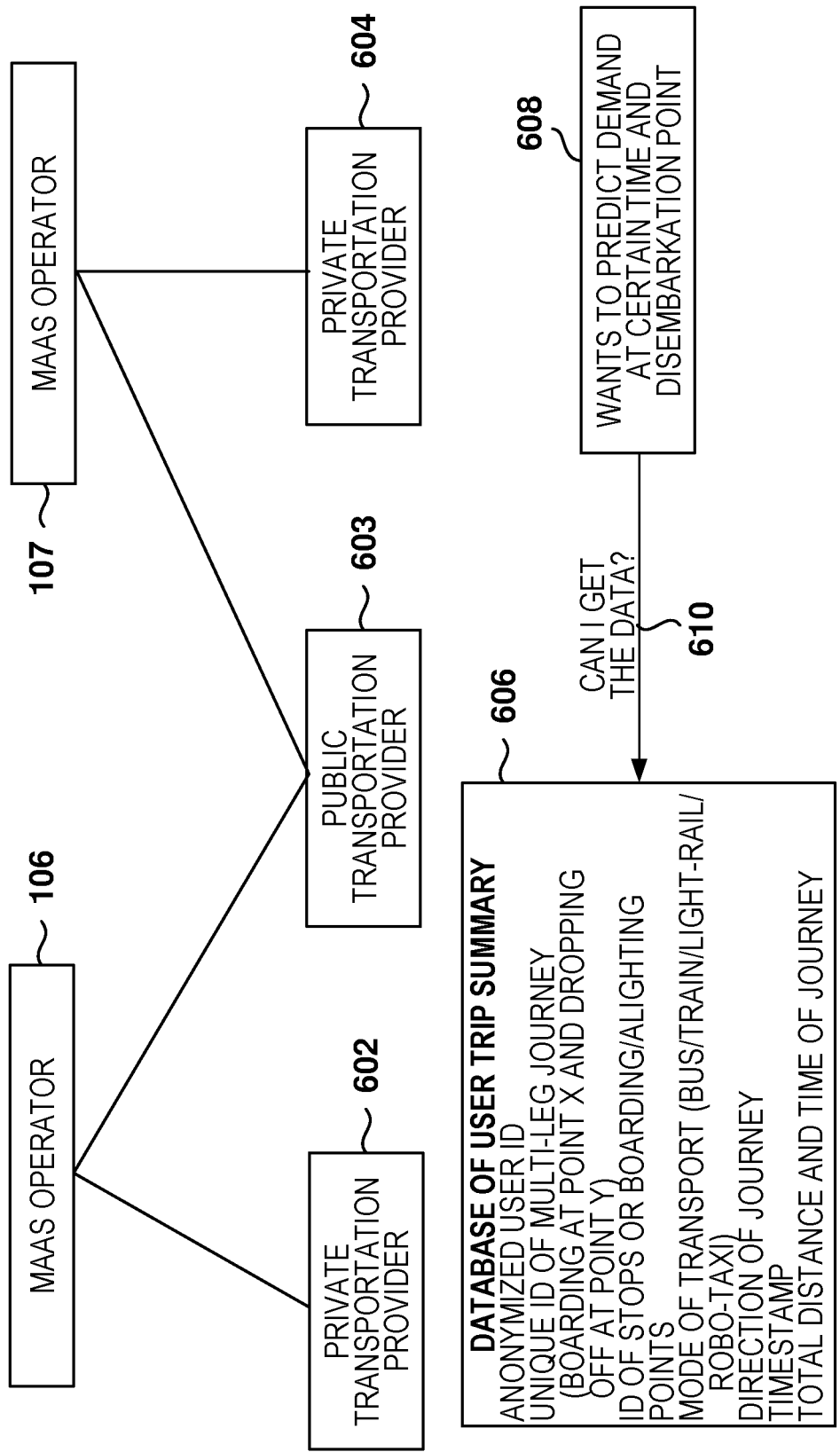
FIG. 6 illustrates the operation of the recommendation model, according to some example embodiments.

FIG. 6 illustrates the operation of the recommendation model and the protection of user data, according to some example embodiments. In the example illustrated in FIG. 6, MaaS operator 107 wants to predict user demand (operation 608) at a certain time and in a certain area (e.g., disembarkation point). MaaS operator 107 coordinates activities with a public transportation provider 603 and a private transportation provider 604. MaaS operator 106 interacts with private transportation provider 602 and public transportation provider 603.

MaaS operator 107 wants to access 610 the data from MaaS operator 106 because the data contains information that assists in predicting user demand, such as drop-off points, mode of transportation, time of day, distance traveled, time of the journey, etc.

As discussed above, integrating vehicle and trip data from multiple MaaS operators serving overlapping geo-areas can help to better match the distribution of their fleets with current and anticipated demand, leading to higher utilization, fewer empty miles, reduced dwell times and greater customer satisfaction.

MaaS operators 106-107 provide services in neighboring geographical areas by leveraging both private and public transportation service providers. As users will disembark at the connecting point (e.g., stop/junction) of two MaaS operators, the MaaS operator 107 wants to predict the mobility demand, including users' preferences (e.g., demand for certain type of car or in-car experience etc.), and dispatch robo-taxis accordingly. In order to perform such prediction, the MaaS operator 107 needs to access data 606 from the database of user trips provided by the MaaS operator 106. Example data 606, in the database of user trip summary, include but are not limited to anonymized user ID, unique ID of multi-leg journey, mode of transportation used by the user, timestamp, total distance, time of the journey, etc. Since the data and context are privacy sensitive, the TEE is provided to protect privacy while sharing information (as discussed above with reference to FIG. 5).

The owner of the data fragment (e.g., one MaaS operator) controls which applets are allowed to execute in the TEE and which entities may interface with the TEE. When a peer MaaS operator wishes to access the user's context information, the peer MaaS operator supplies a TEE applet that runs in a sandbox TEE inside the owner MaaS operator's platform. The sandboxed applet requests access to the type of context information needed and specifies the technique used to anonymize the context data.

The data 606 is then processed in the TEE and the predictive model determines the estimated demand based on the current environment, while not sharing any of the data with MaaS operator 107.

For example, a user's device creates a tracking log of every place that the user has been over a period of time. Since it may be very detailed, this data is very sensitive, so the data has to be protected. The requester (e.g., MaaS operator 107) does not need to know the details of where this person has gone, just wants to know whether or not the user is spending a substantial amount of time in a certain geographic area (e.g., a city, a neighborhood). Further, MaaS operator 107 does not need to know the details of a particular individual, but rather a global estimate of the overall user demand for the population at large. For example, MaaS operator 107 may want to know how many of his clients use services at certain times of the day in certain neighborhoods to plan for delivery resources.

The MaaS operator 107 trains a model that inputs the user data to predict the demand. The model is then used in a TEE so the model can access user data, while protecting the privacy of the data. Further, for large populations of users (e.g., 10,000), having the predicted demand does not mean that predictions may be made for a particular individual. Further, the TEE guarantees that the results are only sent to the MaaS operator 107 to further protect confidentiality.

Figure 7:
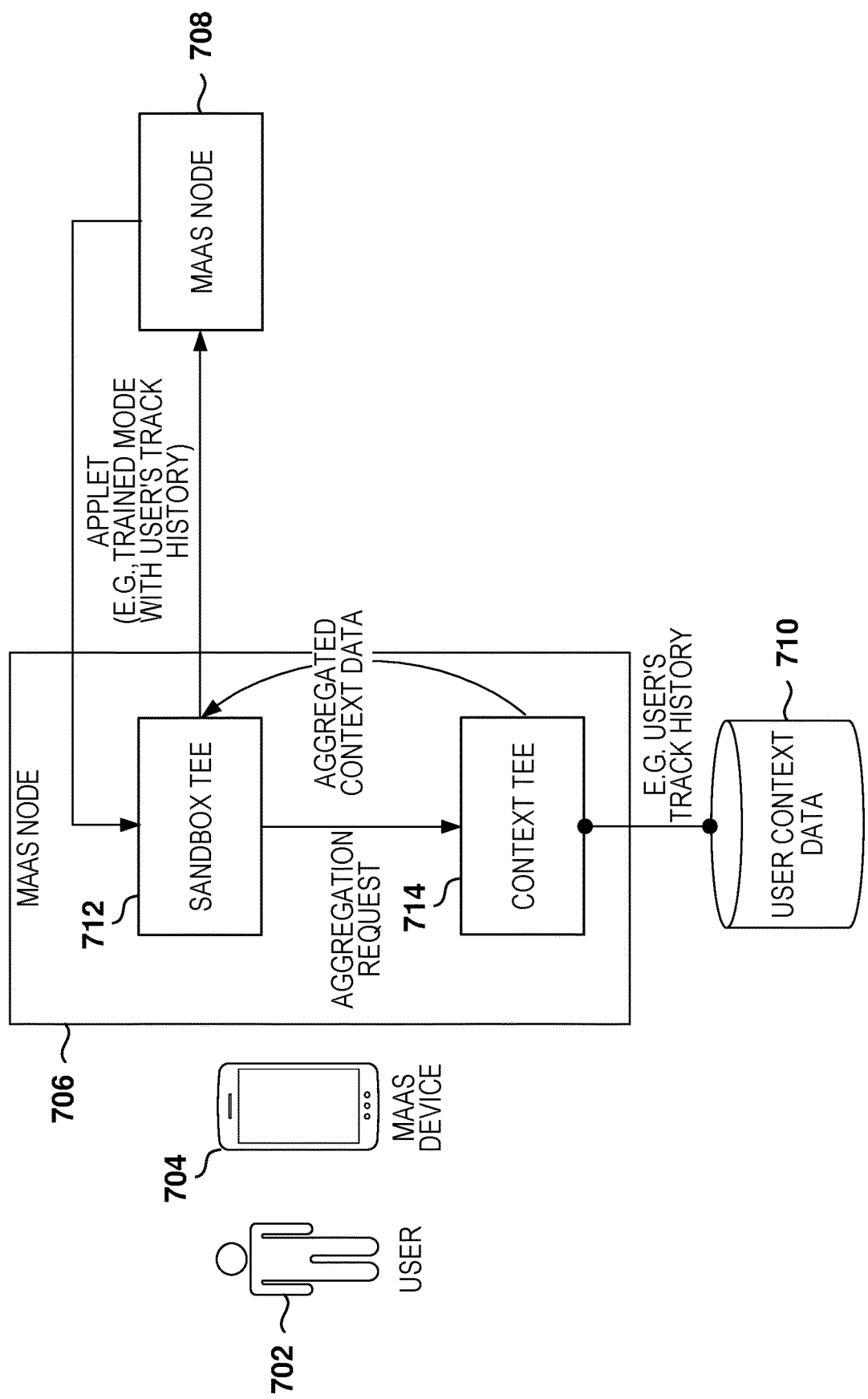
FIG. 7 illustrates how to protect the privacy of sensitive context data maintained on one MaaS node when the data is accessed by an external entity, according to some example embodiments.

FIG. 7 illustrates how to protect the privacy of sensitive user context data 710 maintained on one MaaS node 706 when the data 710 is accessed by an external entity, according to some example embodiments. A MaaS device 704 of user 702 access the MaaS node 706 for performing MaaS operations. The MaaS node 706 contains a context TEE 714 that has exclusive access to privacy-sensitive context data. User context data 710 may be, for example, an archive or history of sensor samples that may be collected over time.

The context TEE 714 exposes an internal interface to a sandbox TEE 712 that is used to host applets of the MaaS node 708. The sandbox TEE 712 ensures that the applet is not able to observe other activities on the MaaS node 706 or take control of it. The sandbox TEE 712 runs the applet provided by the MaaS node 708, which makes aggregation requests for user context data 710 from the context TEE 714.

The aggregation requests identify the form of context data aggregation or anonymization technique to apply to the raw context data. For example, a location track history could include routes to various destinations but omit the frequency, travel time, and other ancillary context. The sandbox TEE 712 incorporates aggregate context data into the sandbox applet processing.

The sandbox applet applies a peer MaaS entity's algorithm to the data set. In this example, the applet is an AI training workload that includes a partially trained model from previous users. AI training incorporates the aggregate context data into the model which further anonymizes the data. The resulting trained model does not reveal any specific detail about the user or the tracking history that is unique to the user.

Figure 8:
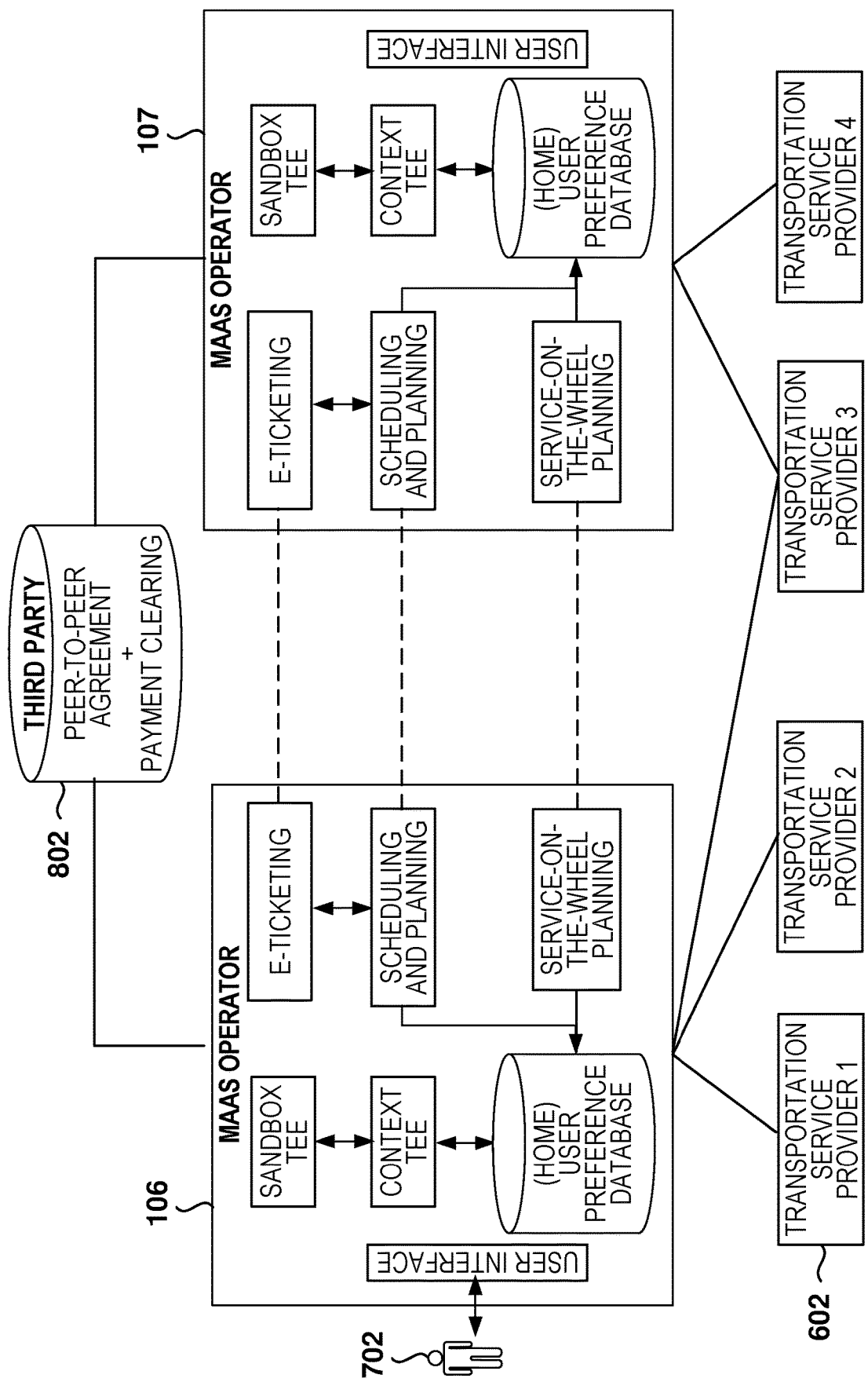
FIG. 8 illustrates dynamic partnering among operators to provide users with a seamless transportation service, according to some example embodiments.

FIG. 8 illustrates dynamic partnering among operators to provide users with a seamless transportation service, according to some example embodiments.

A dynamic partnering framework among the MaaS operators (e.g., MaaS operators 106 and 107) enables seamless movement of users and service-on-the-wheels from one operator's jurisdiction to another (similar to roaming phone service in cellular networks). The partnering includes a messaging protocol for real-time response, exchanging users' preferences and e-ticket information using a sandbox TEE, a clearing payment system, and a vehicle scheduling algorithm, that satisfy users' needs and respect peer-to-peer roaming agreements. In some example embodiments, a third party 802 facilitates communications between the MaaS operators 106, 107, which may include supporting peer-to-peer agreements for transportation services as well as payment clearing between them.

The MaaS operators 106, 107 cooperate for electronic ticketing in order to provide one ticket to the user 702 for multiple activities, such as multiple legs in a trip with different TSPs. In this example, the user 702 accesses the services of MaaS operator 106 via a user interface. The user 702 may for example request a trip that requires the coordination of the two MaaS operators 106, 107.

Each MaaS operator 106, 107 works with one or more respective TSPs 602 to schedule the trip, or some other service, like getting tickets for a movie. The MaaS operators 106, 107 exchange messages to schedule and plan the service delivery. Further, as discussed above, each MaaS operator 106, 107 has the sandbox TEE to allow other operators to gather user data while preserving privacy.

This architecture allows multiple MaaS operators to plan user routes together, but the architecture goes further because it allows the MaaS operators to have protected access to the user data, which allows the multiple MaaS operators to improve their operations, e.g., by better predicting demand, and by scheduling resources based on the predicted demand. For example, one user may prefer to use luxury vehicles during transportation, and this information is made available to MaaS operator 107 in order to deliver a luxury vehicle.

Figure 9:
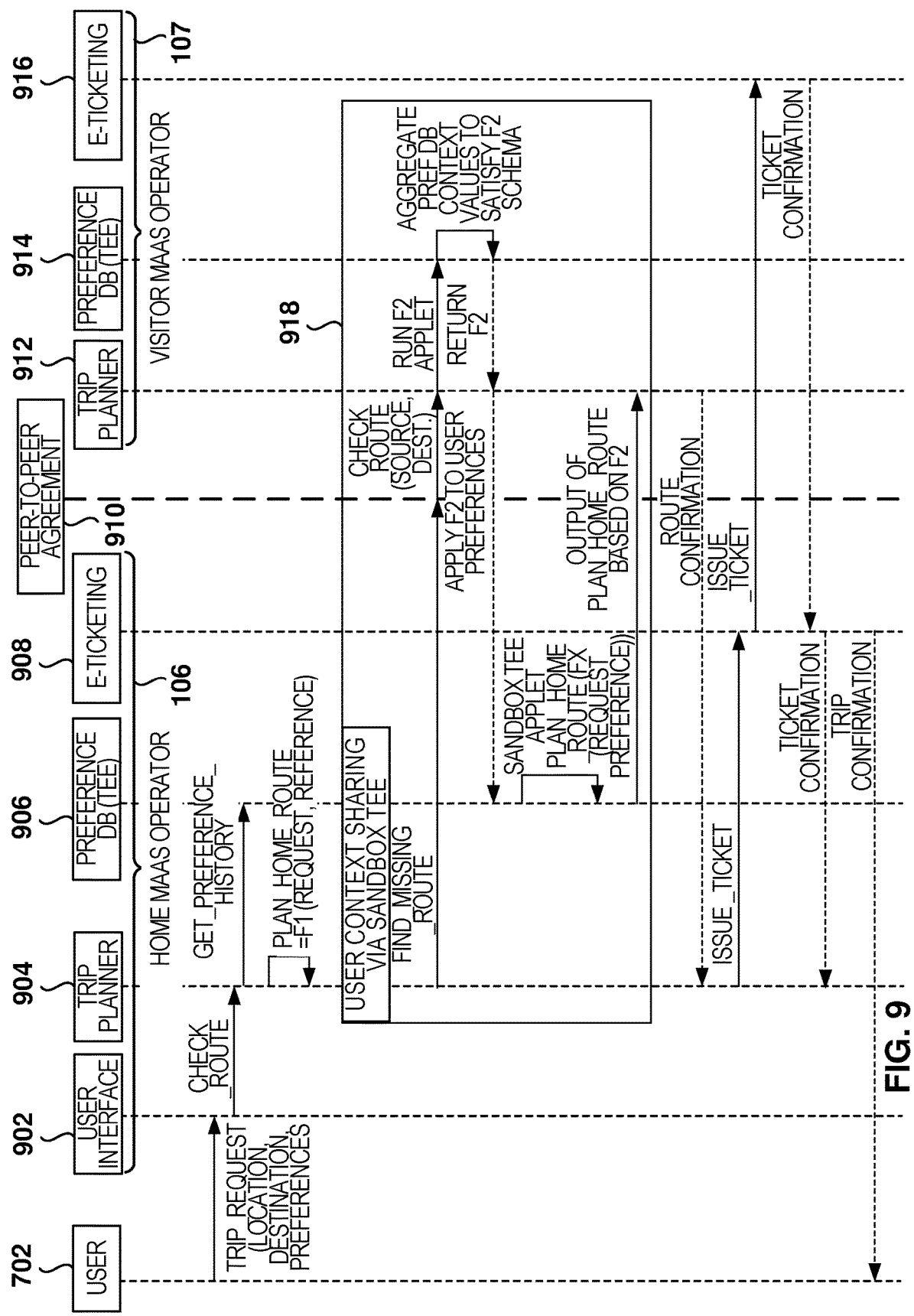
FIG. 9 is a sequence diagram showing an example exchange where one operator lacks context information known to another operator.

FIG. 9 is a sequence diagram showing an example exchange where one MaaS operator 106 lacks context information known to another MaaS operator 107. In this scenario, the user requests a multi-leg trip from location A to location B that involves the interaction between two MaaS operators (the originator MaaS operator is called the home MaaS operator 106 and the other MaaS operator is referred to as the visitor MaaS operator 107).

The user 702 requests a trip via user interface 902; the trip request is sent to trip planner 904 and includes source, destination, and optionally some preferences of the user 702. The trip planner 904 determines that it cannot cover the whole trip itself and needs to consult with the visitor MaaS operator 107. For the local part of the trip, the trip planner 904 runs a local algorithm (referred to as f1) that takes the user request, current-preference, and historical-preference data 906 into consideration to find the best suitable route and vehicle.

After the route and vehicle are determined, the trip planner 904 sends a request to the trip planner 912 of the visitor MaaS operator 107 either via a third party or via a well-defined API (e.g., REST API) to determine the missing route of the journey involving the visitor MaaS operator 107.

The visitor MaaS operator 107 has its own algorithm (referred to as f2) to determine the best suitable route and vehicle type for the user but needs to access user context/preference information or database. The user context sharing operations 918 utilize the sandbox TEE approach used to let the visitor MaaS operator run its applet (containing f2) in the sandbox TEE of the home MaaS operator 106, which has an interface with the local context TEE (containing users' historical preference). The output of f2 is fed back to the visitor MaaS operator 107 trip planner 912 which uses this information plus peer-to-peer agreements 910, and preferences of users identified in preference database 914, to finalize the rest of the route.

When the route is confirmed, route and ticket information 908, 916 is exchanged between the MaaS operators, including the confirmation of the ticket and the trip.

In one example application for service-on-the-wheels, a user from a particular geographic area is interested to use services (e.g., an organic grocery) from another area. The proposed framework enables sharing of user preferences and demand of services among the MaaS operators. Based on user preference and the service in question, partnering MaaS operators select appropriate mode/class of vehicle and ensure unloading/loading of goods in a designated area (mutually agreed and mandated by the city authority) with real-time status updates to the user.

It is noted that the proposed solutions are not only limited to cross MaaS operators but also can be expanded for data sharing among other MaaS stakeholders while preserving privacy, e.g., sharing of fragment datasets among network operators (e.g., people mobility patterns for various geographic areas and times of day), multiple parties within a smart city (e.g., parking and charging utilization availability, route occupancy, congestion context), city-tourist information centers (e.g., data set about upcoming events), etc., to optimize MaaS operation and planning.

Figure 10:
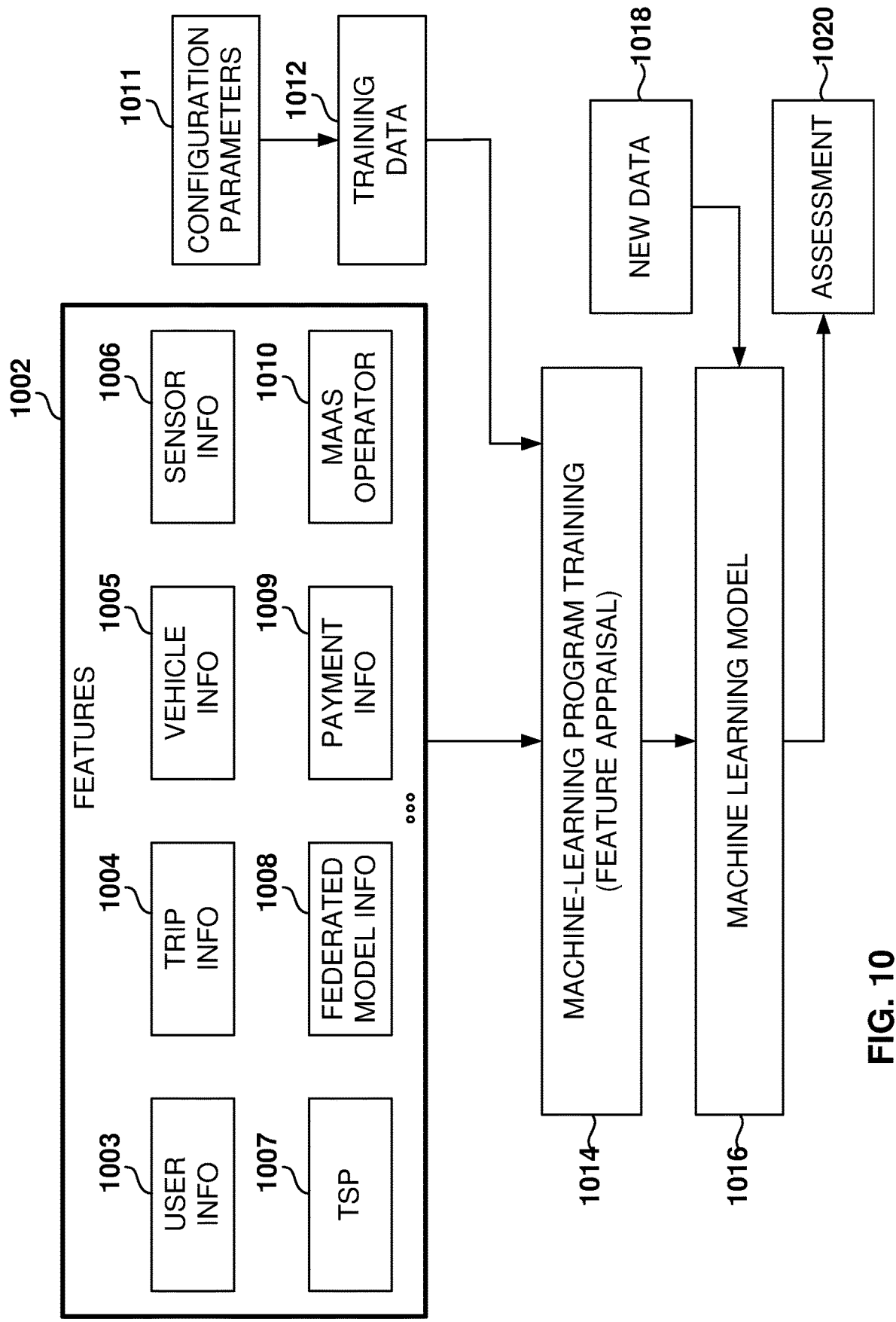
FIG. 10 illustrates the training and use of a machine-learning program, according to some example embodiments.

FIG. 10 illustrates the training and use of a machine-learning program, according to some example embodiments. In some example embodiments, machine-learning programs (MLPs), also referred to as machine-learning algorithms or tools, are utilized to perform operations associated with MaaS operations.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1016 from example training data 1012 in order to make data-driven predictions or decisions expressed as outputs or assessments 1020. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed.

Federated learning enables multiple actors to build a common, robust machine learning model without sharing data, which enables multi-user cooperation while addressing critical issues such as data privacy, data security, data access rights and access to heterogeneous data.

In some embodiments, example ML model 1016 provides a prediction related to MaaS services, such as the recommendation model 304 presented in FIG. 3, the electrical-vehicle failure-prediction model 404 presented in FIG. 4, the models presented in FIG. 5, the demand prediction model presented in FIGS. 6-9, etc.

The training data 1012 comprises examples of values for the features 1002. In some example embodiments, the training data 1012 comprises labeled data with examples of values for the features 1002 and labels indicating the outcome, such as trip outcome, trip demand, electric-vehicle failure, etc. The machine-learning algorithms utilize the training data 1012 to find correlations among identified features 1002 that affect the outcome. A feature 1002 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 1002 may be of different types and may include one or more of user information 1003, trip information 1004, vehicle information 1005, vehicle sensor information 1006, TSP information 1007, federated-model information 1008, payment information 1009, MaaS operator information 1010, etc.

During training 1014, the ML algorithm analyzes the training data 1012 based on identified features 1002 and configuration parameters 1011 defined for the training 1014. The result of the training 1014 is an ML model 1016 that is capable of taking inputs to produce assessments.

Training an ML algorithm involves analyzing large amounts of data (e.g., from several gigabytes to a terabyte or more) in order to find data correlations. The ML algorithms utilize the training data 1012 to find correlations among the identified features 1002 that affect the outcome or assessment 1020. In some example embodiments, the training data 1012 includes labeled data, which is known data for one or more identified features 1002 and one or more outcomes, such as trips delivered, vehicle sensor information, vehicle failures, beginning and ending trip locations, user information, actual demand measured, etc.

The ML algorithms usually explore many possible functions and parameters before finding what the ML algorithms identify to be the best correlations within the data; therefore, training may make use of large amounts of computing resources and time.

Many ML algorithms include configuration parameters 1011, and the more complex the ML algorithm, the more parameters there are that are available to the user. The configuration parameters 1011 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources.

When the ML model 1016 is used to perform an assessment, new data 1018 is provided as an input to the ML model 1016, and the ML model 1016 generates the assessment 1020 as output. The assessment 1020 may be, for example, the prediction of failure of the vehicle, demand prediction at a geographic region, user preferences, etc.

Figure 11:
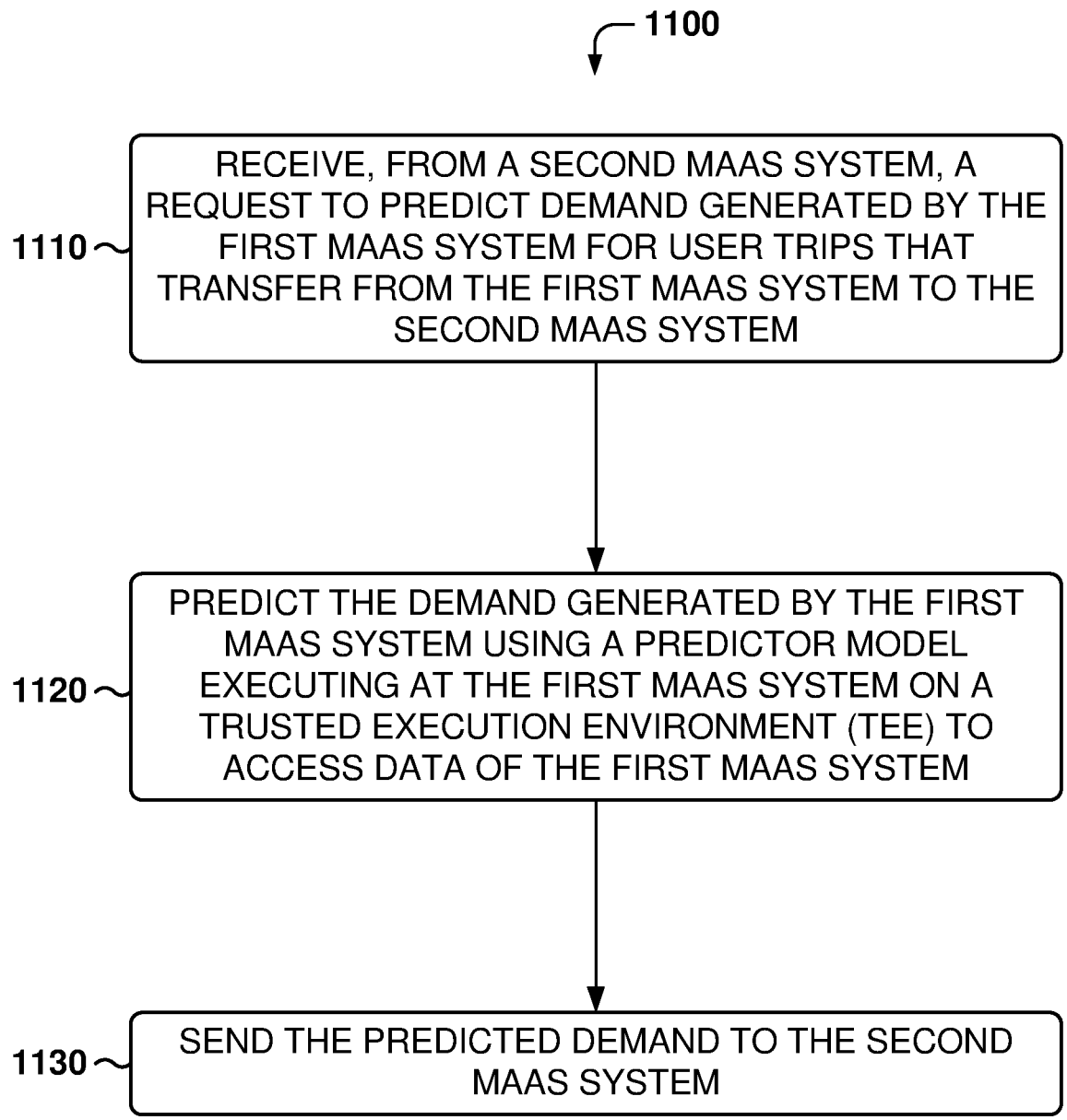
FIG. 11 is a flowchart of a method for enabling collaboration among multiple service transportation service providers, according to some example embodiments.

FIG. 11 is a flowchart of a method 1100, implemented by a processor of a first mobility as a service (MaaS) system, for enabling collaboration among multiple service transportation service providers, according to some example embodiments. While the various operations in this flowchart are presented and described sequentially, one of ordinary skill will appreciate that some or all of the operations may be executed in a different order, be combined or omitted, or be executed in parallel.

In some implementations, one or more process blocks of FIG. 11 may be performed by a processor (e.g., processor 1202). In some implementations, one or more process blocks of FIG. 11 may be performed by another device or a group of devices separate from or including the processor. Additionally, or alternatively, one or more process blocks of FIG. 11 may be performed by one or more components of machine 1200, such as processor 1202, memory 1204, mass storage component 1216, input device 1212, display device 1210, and/or network interface device 1220.

Operation 1110 includes receiving, from a second MaaS system, a request to predict demand generated by the first MaaS system for user trips that transfer from the first MaaS system to the second MaaS system.

Operation 1120 includes predicting, in response to the request, the demand generated by the first MaaS system using a predictor model executing at the first MaaS system on a trusted execution environment (TEE) to access data of the first MaaS system.

At operation 1130, the first MaaS system sends the predicted demand to the second MaaS system.

The method 1100 may include additional implementations, such as any single implementation or any combination of implementations described below and/or in connection with one or more other processes described elsewhere herein.

In one example, the predictor model is trained with data of users and trips of the first MaaS system.

In one example, the method 1100 includes providing, by the first MaaS system, a user interface to request a service-on-the-wheels by a user, the service-on-the-wheels requiring services from a plurality of MaaS systems including unloading of goods at a location of the user; and selecting, by the first MaaS system, the second MaaS system for obtaining the goods, wherein the goods are to be transported by a combination of at least the first and the second MaaS systems to the location of the user.

In one example, the features associated with the predictor model include user information, trip information, vehicle information, and vehicle sensor information.

In one example, the method 1100 includes providing, by the first MaaS system, a user interface to request a trip by a user, the trip requiring services from a plurality of MaaS systems; and selecting, by the first MaaS system, a route utilizing the services of the plurality of MaaS systems.

In one example, the method 1100 includes predicting, by the first MaaS system, user preferences of a user that is on a trip using the first and the second MaaS systems, the preferences being predicted by a preferences model executing at the first MaaS system on the TEE to access data of the first MaaS system.

In one example, the TEE protects data at the first MaaS system from access by the first MaaS system, and vice versa.

In one example, the method 1100 includes sharing, by the first MaaS system, vehicle-failure information with other MaaS systems to create a federated vehicle-failure prediction model to predict failures in vehicles.

Another general aspect is for a MaaS system that includes a memory comprising instructions and one or more computer processors. The instructions, when executed by the one or more computer processors, cause the one or more computer processors to perform operations comprising: receiving, from a second MaaS system, a request to predict demand generated by the first MaaS system for user trips that transfer from the first MaaS system to the second MaaS system; predicting, in response to the request, the demand generated by the first MaaS system using a predictor model executing at the first MaaS system on a trusted execution environment (TEE) to access data of the first MaaS system; and sending the predicted demand to the second MaaS system.

In yet another general aspect, a machine-readable storage medium (e.g., a non-transitory storage medium) includes instructions that, when executed by a machine of a first MaaS system, cause the machine to perform operations comprising: receiving, from a second MaaS system, a request to predict demand generated by the first MaaS system for user trips that transfer from the first MaaS system to the second MaaS system; predicting, in response to the request, the demand generated by the first MaaS system using a predictor model executing at the first MaaS system on a trusted execution environment (TEE) to access data of the first MaaS system; and sending the predicted demand to the second MaaS system.

In yet another general aspect, a second MaaS system includes: means for sending, to a first MaaS system, a request to predict demand generated by the first MaaS system for user trips that transfer from the first MaaS system to the second MaaS system, wherein the first MaaS system is configured to predict the demand using a predictor model executing at the first MaaS system on a trusted execution environment (TEE) to access data of the first MaaS system; and means for receiving the predicted demand from the first MaaS system.

Figure 12:
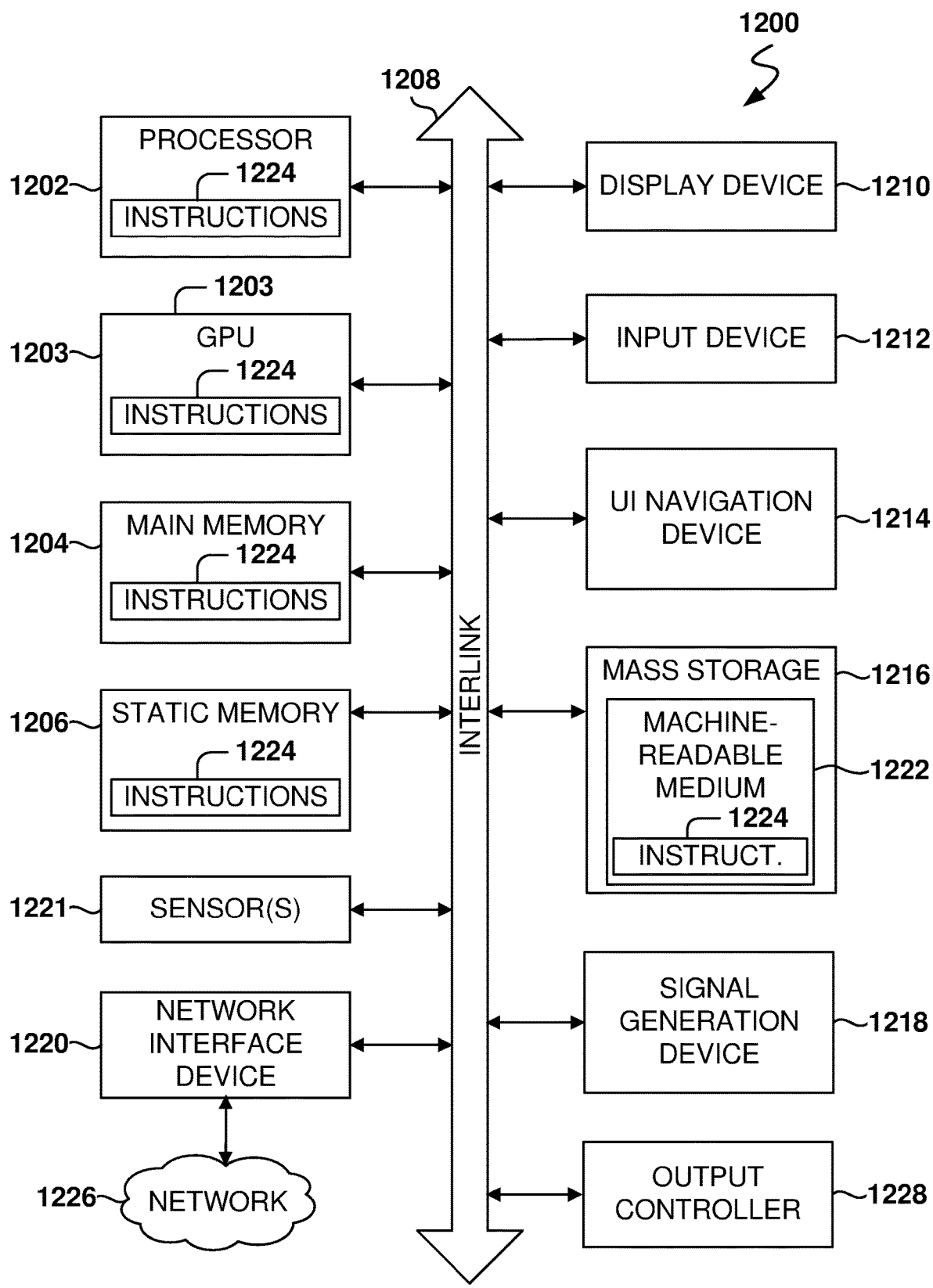
FIG. 12 is a block diagram illustrating an example of a machine upon or by which one or more example process embodiments described herein may be implemented or controlled.

FIG. 12 is a block diagram illustrating an example of a machine 1200 upon or by which one or more example process embodiments described herein may be implemented or controlled. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1200 may include a hardware processor 1202 (e.g., a central processing unit (CPU), a hardware processor core, or any combination thereof), a graphics processing unit (GPU) 1203, a main memory 1204, and a static memory 1206, some or all of which may communicate with each other via an interlink (e.g., bus) 1208. The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device (e.g., drive unit) 1216, a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, within the hardware processor 1202, or within the GPU 1203 during execution thereof by the machine 1200. In an example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium, or multiple media, (e.g., a centralized or distributed database, and/or associated caches and servers) configured to store the one or more instructions 1224.

The term "machine-readable medium" may include any medium that is capable of storing, encoding, or carrying instructions 1224 for execution by the machine 1200 and that cause the machine 1200 to perform any one or more of the techniques of the present disclosure, or that is capable of storing, encoding, or carrying data structures used by or associated with such instructions 1224. Non-limiting machine-readable medium examples may include solid-state memories, and optical and magnetic media. In an example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A first mobility as a service (MaaS) system comprising:
    a memory comprising instructions; and
    one or more computer processors, wherein the instructions, when executed by the one or more computer processors, cause the first MaaS system to perform operations comprising:
        receiving, from a second MaaS system, a request to predict demand generated by the first MaaS system for user trips that transfer from the first MaaS system to the second MaaS system;
        training, using federated learning techniques, a predictor model to predict the demand generated by the first MaaS system, the predictor model executing at the first MaaS system on a trusted execution environment (TEE) of the one or more computer processors to access data of the first MaaS system while preserving privacy of sensitive context data between the first MaaS system and the second MaaS system, the training aggregating data from multiple MaaS systems without sharing raw data,
        the TEE including a context TEE and a sandbox TEE established as separate isolated environments within the one or more computer processors,
        the context TEE configured to have exclusive access to privacy-sensitive context data and expose an anonymized form of the privacy-sensitive context data via an internal interface to the sandbox TEE,
        the sandbox TEE configured to sandbox an application and execute the application, the sandboxed application configured to process the request from the second MaaS system and to make a request for user context data from the context TEE, and the sandboxed application configured to request access to the user context data and specify an anonymization technique used by the context TEE to anonymize the user context data;
        predicting, in response to the request, the demand generated by the first MaaS system using the trained predictor model based on historical data and user preferences collected from the first MaaS system;
        updating the trained predictor model using the federated learning techniques to aggregate further data from the multiple MaaS systems without sharing raw data; and
        sending the predicted demand to the second MaaS system.

2. The first MaaS system as recited in claim 1, wherein the predictor model is trained with data of users and trips of the first MaaS system.

3. The first MaaS system as recited in claim 1, wherein the instructions further cause the one or more computer processors to perform operations comprising:
    providing, by the first MaaS system, a user interface to request a service-on-the-wheels by a user, the service-on-the-wheels requiring services from a plurality of MaaS systems including unloading of goods at a location of the user; and
    selecting, by the first MaaS system, the second MaaS system for obtaining the goods, wherein the goods are to be transported by a combination of at least the first and the second MaaS systems to the location of the user.

4. The first MaaS system as recited in claim 1, wherein features associated with the predictor model include user information, trip information, vehicle information, and vehicle sensor information.

5. The first MaaS system as recited in claim 1, wherein the instructions further cause the one or more computer processors to perform operations comprising:

providing, by the first MaaS system, a user interface to request a trip by a user, the trip requiring services from a plurality of MaaS systems; and selecting, by the first MaaS system, a route utilizing the services of the plurality of MaaS systems.

6. The first MaaS system as recited in claim 1, wherein the instructions further cause the one or more computer processors to perform operations comprising:

predicting, by the first MaaS system, user preferences of a user that is on a trip using the first and the second MaaS systems, the preferences being predicted by a preferences model executing at the first MaaS system on the TEE to access data of the first MaaS system.

7. The first MaaS system as recited in claim 1, wherein at least one of:

the application makes aggregation requests for user context data from the context TEE, and the aggregation requests identify at least one of a form of context data aggregation or anonymization technique to apply to the user context data, or the application is an AI training workload that includes a partially trained predictor model from previous users, and AI training incorporates aggregate context data into the partially trained predictor model to further anonymize the privacy-sensitive context data that has been aggregated to result in a trained predictor model that does not reveal specific details about a user, including tracking history that is unique to the user.

8. The first MaaS system as recited in claim 1, wherein the instructions further cause the one or more computer processors to perform operations comprising:

matching specifications of the predictor model between the first MaaS system and the second MaaS system, the specifications selected from a group of features that includes a regression model, a neural network, a number of layers, and hyper parameters, and training a respective predictor model of the first MaaS system and the second MaaS system, training of the respective predictor model limited to using data respectively collected on a platform of the first MaaS system and the second MaaS system.

9. The first MaaS system as recited in claim 1, wherein:

an applet configured to operate in the sandbox TEE is an AI training workload that includes a partially trained predictor model from previous users, and AI training incorporates aggregate context data into the partially trained predictor model to further anonymize the privacy-sensitive context data that has been aggregated to result in a trained predictor model that does not reveal specific details about a user or tracking history that is unique to a user.

10. The first MaaS system as recited in claim 1, wherein:

the predictor model is trained on a set of data that includes electric-vehicle (EV) failure-prediction having an output that includes a prediction of a probability of failure within a predetermined time period, and the EV failure-prediction contains electric, instrumentation, and control-system features and driving features selected from a group of features that includes Battery Management System (BMS) battery voltage, motor control unit front wheel current, in-car temperature, BMS outlet water temperature, outside temperature, control unit compressor battery power, pressure on brake pedal during an emergency stop, wheel speed, and acceleration.

11. The first MaaS system as recited in claim 1, wherein the instructions further cause the one or more computer processors to perform operations comprising:

matching specifications of the predictor model between the first MaaS system and the second MaaS system, the specifications selected from a group of features that includes a regression model, a neural network, a number of layers, and hyper parameters, and training a respective predictor model of the first MaaS system and the second MaaS system, training of the respective predictor model limited to using data respectively collected on a platform of the first MaaS system and the second MaaS system.

12. The first MaaS system as recited in claim 1, wherein:

the instructions further cause the one or more computer processors to perform operations comprising aggregating predictor models between the first MaaS system and the second MaaS system in the TEE using federated learning to generate a federated model and share the federated model with MaaS nodes and MaaS control centers as the predictor model to periodically replace the predictor model with the federated model, and the federated learning includes a machine-learning technique that trains an algorithm across multiple decentralized devices holding local data without exchanging the local data.

13. The first MaaS system as recited in claim 1, wherein the TEE includes a secure, isolated area inside a processor or a server, to execute an operation while guaranteeing that code and data loaded in the TEE are protected with respect to confidentiality and integrity, the TEE is configured to protect privacy sensitive context information through control of access to the privacy sensitive context information.

14. The first MaaS system as recited in claim 1, wherein:

the instructions further cause the one or more computer processors to control which TEE applets are allowed to execute in the TEE and which entities are permitted to interface with the TEE, a peer MaaS system is configured to access user context information via a peer TEE applet that runs in the TEE, and the peer TEE applet is configured to request access to the user context information and specify a technique used to anonymize the user context information.

15. The first MaaS system as recited in claim 1, wherein:

a peer MaaS system is configured to access user context information via a peer applet that runs in the TEE, the peer applet is configured to request access to the user context information and specify a technique used to anonymize the user context information, and the first MaaS system further comprises the instructions further cause the one or more computer processors to control which applets are allowed to execute in the TEE and which entities are permitted to interface with the TEE.

16. The first MaaS system as recited in claim 1, wherein:

the TEE is disposed in a MaaS node, the sandbox TEE is configured to host an applet of the MaaS node, the sandbox TEE is configured to:

limit functionality of the applet to be unable to observe other activities on the MaaS node or take control of the MaaS node, and apply a peer MaaS entity algorithm to the user context data, the applet makes aggregation requests for the user context data from the context TEE, and the aggregation requests identify a form of context data aggregation and the anonymization technique to apply to the user context data.

17. The first MaaS system as recited in claim 1, wherein:

the predictor model is trained using a combination of historical user data and real-time data from the first MaaS system, the predictor model uses a multi-layer neural network to enhance prediction accuracy, and vehicles are configured to satisfy the predicted demand arising in a predetermined area.

18. A tangible machine-readable storage medium including instructions that, when executed by a machine of a first mobility as a service (MaaS) system, cause the machine to perform operations comprising:

training, using federated learning techniques, a predictor model to predict demand generated by the first MaaS system, the predictor model executing at the first MaaS system on a trusted execution environment (TEE) to access data of the first MaaS system while preserving privacy of sensitive context data between the first MaaS system and a second MaaS system, the training aggregating data from multiple MaaS systems without sharing raw data, the TEE including a context TEE and a sandbox TEE, the context TEE configured to have exclusive access to privacy-sensitive context data and expose the privacy-sensitive context data via an internal interface to the sandbox TEE, the sandbox TEE configured to sandbox an application and execute the application to make a request for user context data from the context TEE, and the application configured to request access to the user context data and specify an anonymization technique used to anonymize the user context data;

predicting, in response to the request, the demand generated by the first MaaS system using the trained predictor model based on based on historical data and user preferences collected from the first MaaS system;

updating the trained predictor model using the federated learning techniques to aggregate further data from the multiple MaaS systems without sharing raw data; and sending the predicted demand to the second MaaS system.

19. The tangible machine-readable storage medium as recited in claim 18, wherein the predictor model is trained with data of users and trips of the first MaaS system.

20. The tangible machine-readable storage medium as recited in claim 18, wherein the machine further performs operations comprising:

providing, by the first MaaS system, a user interface to request a service-on-the-wheels by a user, the service-on-the-wheels requiring services from a plurality of MaaS systems including unloading of goods at a location of the user; and selecting, by the first MaaS system, the second MaaS system for obtaining the goods, wherein the goods are to be transported by a combination of at least the first and the second MaaS systems to the location of the user.

21. The tangible machine-readable storage medium as recited in claim 18, wherein features associated with the predictor model include user information, trip information, vehicle information, and vehicle sensor information.

22. The tangible machine-readable storage medium as recited in claim 18, wherein the machine further performs operations comprising:

providing, by the first MaaS system, a user interface to request a trip by a user, the trip requiring services from a plurality of MaaS systems; and selecting, by the first MaaS system, a route utilizing the services of the plurality of MaaS systems.

23. The tangible machine-readable storage medium as recited in claim 18, wherein the machine further performs operations comprising:

predicting, by the first MaaS system, user preferences of a user that is on a trip using the first and the second MaaS systems, the preferences being predicted by a preferences model executing at the first MaaS system on the TEE to access data of the first MaaS system.

* * * * *